United States Patent
Guo et al.

(12)

(10) Patent No.: US 6,173,330 B1
(45) Date of Patent: Jan. 9, 2001

(54) DELIVERY AND ACQUISITION OF DATA SEGMENTS WITH OPTIMIZED INTER-ARRIVAL TIME

(75) Inventors: Zicheng Guo; Mark K. Eyer, both of San Diego, CA (US)

(73) Assignees: Motorola, Inc., Schaumburg, IL (US); General Instrument Corporation, Horsham, PA (US)

( * ) Notice: Under 35 U.S.C. 154(b), the term of this patent shall be extended for 0 days.

(21) Appl. No.: 08/718,636

(22) Filed: Sep. 17, 1996

(51) Int. Cl.⁷ .............................. G06F 17/30; H04N 7/16
(52) U.S. Cl. ................... 709/232; 709/236; 709/231; 341/81; 348/17
(58) Field of Search .................................. 709/230, 231, 709/232, 234, 236; 341/61, 81; 348/7, 17, 473, 461

(56) References Cited

U.S. PATENT DOCUMENTS

| | | | |
|---|---|---|---|
| 5,056,105 | * 10/1991 | Darmon et al. | 341/81 |
| 5,301,018 | 4/1994 | Smidth et al. | 348/420 |
| 5,440,706 | 8/1995 | Juri et al. | 711/202 |
| 5,572,532 | * 11/1996 | Fimoff et al. | 341/81 |
| 5,608,732 | 3/1997 | Bestler et al. | 370/474 |
| 5,677,911 | * 10/1997 | Fimoff et al. | 714/701 |
| 5,721,823 | * 2/1998 | Chen et al. | 709/203 |
| 5,801,753 | * 9/1998 | Eyer et al. | 348/13 |
| 5,933,431 | * 8/1999 | Ko | 341/81 |

FOREIGN PATENT DOCUMENTS

| | | |
|---|---|---|
| 0 758 833 | 2/1997 | (EP) . |
| WO 94/19881 | 9/1994 | (WO) . |

OTHER PUBLICATIONS

Bestler, Caitlin, "Flexible Data Structures and Interface Rituals for Rapid Development of OSD Applications," *1993 NCTA Technical Paper*, Jun. 6, 1993, pp. 223–236.

H. Stone, "Parallel Processing with the Perfect Shuffle," *IEEE Transactions on Computers*, vol. C–20, No. 2, Feb. 1971, pp. 153–161.

K. Hwang and F. Briggs, "Computer Architecture and Parallel Processing," McGraw–Hill, 1984, pp. 350–354.

* cited by examiner

*Primary Examiner*—Dung C. Dinh
(74) *Attorney, Agent, or Firm*—Barry R. Lipsitz

(57) ABSTRACT

Data pages of an interactive program guide (IPG) for television are transmitted according to a shuffle function which allows different television receivers to retrieve particular segments of the data pages based on the day and time of program listings which a viewer wishes to see. A page of data, which corresponds to a full-screen image, is divided into segments and retrieved by the receivers over time. The segments are shuffled to provide an optimal separation in the data stream. The optimal separation corresponds to the receiver's input buffer size and processing speed. The pages may be arranged sequentially, or with the even-numbered pages separated from the odd-numbered pages. The pages are partitioned into a number of subsets, and, within the pages of each subset, the segments are shuffled according to a perfect shuffle function such that respective adjacent segment pairs are arranged in an order which maximizes a minimum of their inter-segment distance after shuffling. The minimum inter-segment distance of all the subsets is used to determine a characteristic inter-segment arrival time, which must be large enough to correspond to the receiver's processing capability. The required input buffer size and processing speed of the receivers is reduced, yet data page acquisition speed is increased for all viewers.

47 Claims, 9 Drawing Sheets

DELIVERY AND ACQUISITION OF DATA SEGMENTS WITH OPTIMIZED INTER-ARRIVAL TIME

BACKGROUND OF THE INVENTION

The present invention relates to the transmission of data segments such as those used to provide data to receivers for producing an on-screen television programming guide. In particular, a method and apparatus are presented for allowing a receiver to acquire data segments from a data stream at a lower data rate than the nominal data rate of the data stream while also optimizing the response time of the receiver.

Recently, the availability of various video and other programming services for consumers and others has increased. Consumers may receive programming services via cable, terrestrial broadcast, and direct broadcast satellite links. Available programming services include traditional programs provided by national network broadcasters, various special interest programs which cater to those with a special interest in news, politics, sports, nature, movies, weather, history, shopping and the like, and local community programming. Additionally, audio and data programming services are becoming increasingly popular. Audio services provide musical programming or alternative language capability, and data programming provides information such as stock prices, travel and shopping information, and the like. Furthermore, it is expected that traditional television programming services will be integrated with computer-based services to provide even more services from which the viewer may select.

Accordingly, there is a need to inform the viewer of the myriad available programming options in an easy to use format. Various on-screen graphical displays have become available that provide information such as program name, viewing time, and a description, such as the leading actor in a movie. For example, a common display format lists the relevant programming information for a given time period, such as one or two days from the present time. Additionally, the display may provide interactive features, for example, which allow the viewer to switch the channel to directly view a program, order a pay-per-view program, record a program, obtain additional information about a program, such as a detailed movie review, or obtain account information from the programming service provider. Such an on-screen display is known as an interactive program guide (IPG).

Moreover, data for updating the IPG may be transmitted over the same channel as the programming service. One such system for providing IPG data is described in U.S. Pat. No. 5,801,753, issued Sep. 1, 1998 by M. Eyer and Z. Guo, entitled "Method and Apparatus for Providing an Interactive Guide to Events Available on an Information Network," assigned to General Instrument Corporation, the assignee of the present invention, and incorporated herein by reference. In this system, IPG data for a shorter time period (e.g., the next two days) of programming is continuously transmitted in a low rate, "trickle" data stream, while data for a longer time period (e.g., the next seven days) of programming is continuously transmitted at a higher rate in a "demand" data stream. The trickle data stream is automatically received and processed by the receiver to gradually update the display with current information such as last-minute programming changes or corrections in the schedule. The trickle data stream thus provides a continuous update capability while requiring the receiver to store only the data corresponding to two days of programming.

In contrast, the receiver will not acquire and process the high-rate demand data stream unless commanded to do so by the viewer. For example, this may be required when the viewer wishes to obtain information for programming which is scheduled for more than two days in the future. Furthermore, when the viewer commands a function that requires the demand data stream, it is desirable for the information to be retrieved and processed as quickly as possible to avoid inconvenient delays for the viewer.

However, with mass-produced receivers, the data input buffer size and processing speed are limited. Additionally, different viewers will be requesting different portions of the IPG at any given time. Accordingly, it would be desirable to provide a method and apparatus for communicating data to receivers that provides a fast response time without exceeding the receiver's processing capability or overflowing the receiver's buffer. Additionally, the system should be compatible with a data stream protocol wherein data for a single graphical display, or page, is carried in a number of blocks and segments, and where a number of receivers may require data of different blocks or segments of the data stream at the same time. Furthermore, there should be a relatively even waiting time between different viewers who request different information at the same time. The present invention provides a data communication scheme having the above and other advantages.

SUMMARY OF THE INVENTION

In accordance with the present invention, a method and apparatus are presented for allowing a receiver to acquire data segments from a data stream at a lower data rate than the nominal data rate of the data stream while also minimizing the response time of the receiver. The invention is particularly applicable to the communication of interactive program guide (IPG) data for informing television viewers of the available programming services in a particular time period.

A method for communicating pages of data of a transmission cycle over a communication channel includes the step of arranging the pages in a first page order. In particular, the pages may be arranged sequentially, or the even-numbered pages may be separated from the odd-numbered pages. Next, the pages are partitioned into a number of subsets.

Each page includes a number of data segments which are arranged in a first segment order. Next, the data segments are re-arranged according to a perfect shuffle function to provide the segments in an order to achieve an optimal inter-segment distance. This optimal inter-segment distance corresponds to an order that maximizes a minimum of the inter-segment distance of respective segments which were adjacent in the first segment order. Moreover, the minimum inter-segment distance is constrained by the maximum speed with which the receiver can receive and process data. Typically, this speed is limited by the size of the receiver's input buffer and the operating speed of the processor. Any dummy segments which are present in the data pages may be removed after this re-arranging.

Furthermore, the pages may include different types of blocks. Each block is a grouping of segments. In this case, the different types of blocks may be arranged in a first transmission cycle and subsequent transmission cycles which follow such that the different types of blocks are provided at a desired relative frequency. For example, data blocks which have a higher priority may be provided at a higher relative frequency in the transmission cycles. In this way, in case the data stream is temporarily lost, the time for re-acquiring the data stream can be reduced.

A corresponding apparatus is also presented.

A receiver is also presented for processing a data stream which includes a plurality of data pages. The receiver includes means for retrieving particular segments of the pages. For example, a particular IPG page may be divided into five segments, and the receiver will accumulate the segments one by one until it has accumulated all five segments and is able to process the data and reproduce the desired image on a television screen. The segments in the data stream are processed in accordance with the perfect shuffle function to achieve an optimal inter-segment distance in the data stream. In particular, the segments are provided in an order which maximizes a minimum of the inter-segment distance of respective segments which were adjacent prior to being processed in accordance with the perfect shuffle function.

The receiver further includes an input buffer which has a characteristic capacity for receiving the data stream. That is, the buffer may only store a limited amount of data. The receiver also has a processor which has a characteristic processing speed for processing the data received via the input buffer. The processor is thus limited in the speed in which it can process data. Accordingly, the optimal inter-segment distance is constrained by the processing speed.

DETAILED DESCRIPTION OF THE INVENTION

Figure 1:
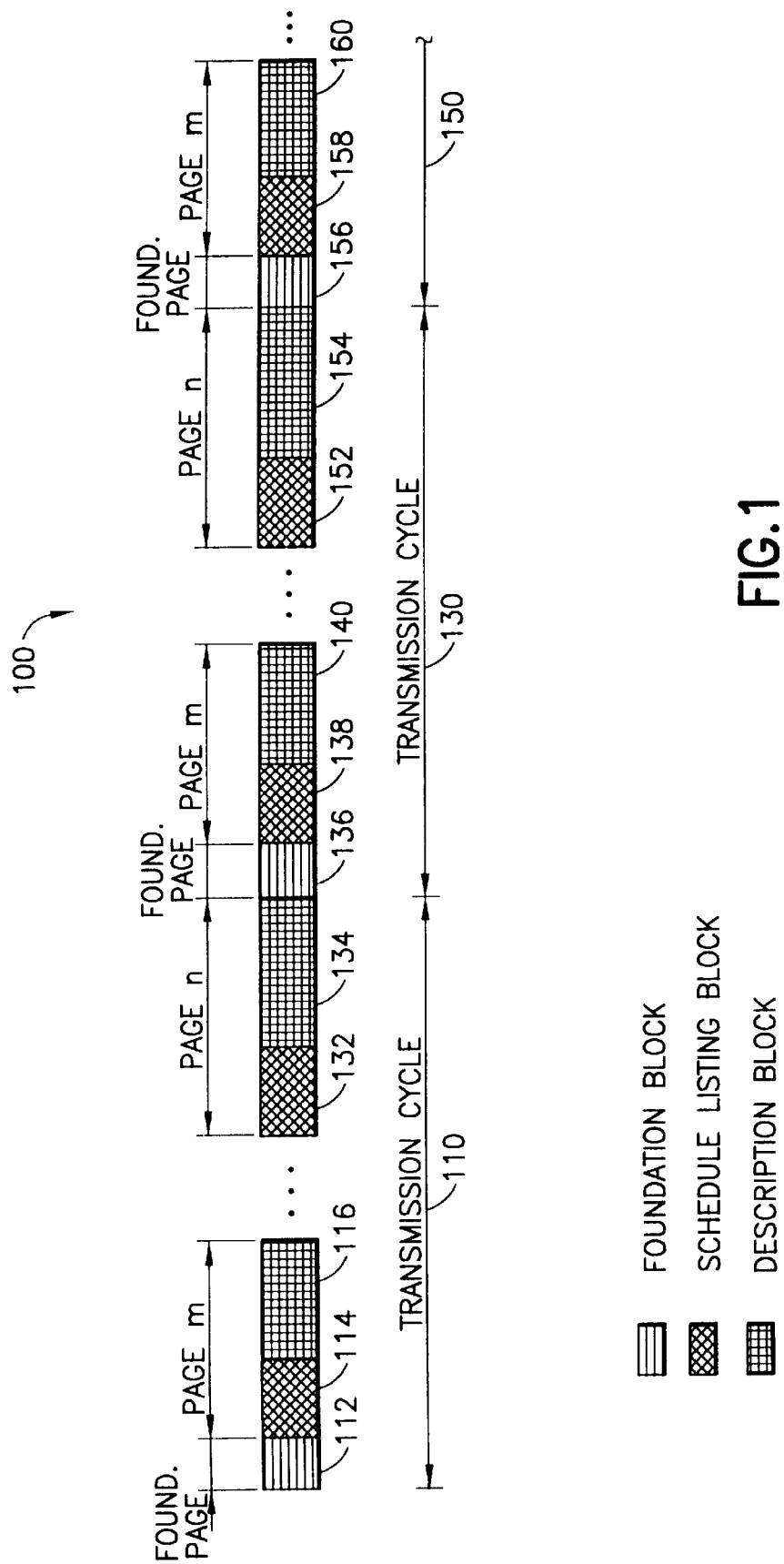
FIG. 1 shows an ordering of pages in a data stream in accordance with the present invention.

Interactive program guide (IPG) data can be transmitted in conjunction with a video programming data stream in a time-multiplexed manner. Time-multiplexing is particularly suitable for the transmission of digital data, wherein the data is transmitted in a number of consecutive data packets. Each data packet may include header data including a packet identifier (PID) which identifies the packet type. A receiver may evaluate the PID of each packet, and retrieve and process only those packets which are of interest.

However, the receiver may not be able to evaluate the PID of each packet if it operates at a slower rate than that of the incoming data stream. Moreover, the receiver's data input buffer may not be large enough to store an entire page of data. In this case, an alternate approach is required to properly synchronize the retrieval of the proper data packets by a specific receiver.

In accordance with the present invention, a method and apparatus for shuffling IPG data segments is presented wherein text messages which define the same page of data are spread out in time to facilitate receiver acquisition and processing.

The present invention applies the "perfect shuffle" function to a number of data segments of a page of a data stream. The perfect shuffle function is known generally as a method of interconnecting processing elements and memory modules. Moreover, shuffling may be used to enhance coding efficiency or disperse the effects of burst errors in data communications.

With the perfect shuffle function, consider a number X which is the product of two integers Y and Z, e.g., X=Y Z. Furthermore, let x and y be integers where $0 \leq x < X$ and $0 \leq y < Y$. Then, the Y-shuffle function is defined as follows:

$$Y\text{-}shuffle(x) = \begin{cases} xY, & 0 \leq x < \dfrac{X}{Y} \\ xY+1-X, & \dfrac{X}{Y} \leq x < \dfrac{2X}{Y} \\ \vdots & \\ xY+y-yX, & \dfrac{yX}{Y} \leq x < \dfrac{(y+1)X}{Y} \\ \vdots & \\ xY+Y-1-(Y-1)X, & \dfrac{(Y-1)X}{Y} \leq x < X \end{cases}$$

The perfect shuffle function can be intuitively understood by considering the shuffling of a deck of X cards. The cards are partitioned into Y subsets, each of size Z. The Y-shuffle function perfectly interleaves the cards from different subsets by taking as an input the first card in each subset, arranging the first cards consecutively at the output, then taking the second card in each subset, arranging the second cards consecutively at the output following the first set of cards, and so on. This is done until all the input cards have been processed and arranged at the output.

For example, consider the two-shuffle function, where Y=2, and the three-shuffle function, where Y=3, defined as follows, with X=18:

$$2\text{-}shuffle(x) = \begin{cases} 2x, & 0 \leq x < 9 \\ 2x-17, & 9 \leq x < 18 \end{cases}$$

$$3\text{-}shuffle(x) = \begin{cases} 3x, & 0 \leq x < 6 \\ 3x-17, & 6 \leq x < 12 \\ 3x-34, & 12 \leq x < 18 \end{cases}$$

With the two-shuffle function, it can be shown that an input sequence 0, 1, 2, 3, 4, 5, 6, 7, 8, 9, 10, 11, 12, 13, 14, 15, 16, 17 is shuffled to the output sequence 0, 9, 1, 10, 2, 11, 3, 12, 4, 13, 5, 14, 6, 15, 7, 16, 8, 17. Furthermore, the perfect shuffle function can be characterized in terms of the distance, $D_x$, between two cards x and x+1 in the shuffled ordering of the X cards. Note that x and x+1 are spaced apart by one card in the original ordering. For example, with the 3-shuffle, for x=14 and x+1=15, $D_x=D_{14}=|3\text{-shuffle}(14)-3\text{-shuffle}(15)|=|8-11|=3$, and $D_{11}=|3\text{-shuffle}(11)-3\text{-shuffle}(12)|=|16-2|=14$. A more complete definition may take into account the effect of periodically duplicating the deck of cards, but that will not affect the definition of the minimum distance, D', as explained in greater detail below.

Let $D'=\min\{D_x\}$ for all valid values of x. Then D'=Y for the Y-shuffle when Y<X. As a special case, when Y=X (or Z=1) we have D'=1, since X-shuffle(x)=x. This minimum distance, D' will, for a given IPG system configuration, determine the inter-segment arrival time, T, defined as the minimum delay between the arrivals of any two segments x and x+1 which belong to the same demand data page at the receiver.

FIG. 1 shows an ordering of pages in a data stream in accordance with the present invention. The data stream, shown generally at 100, includes consecutive transmission cycles, shown at 110, 130 and 150, respectively. The first transmission cycle 110 includes a foundation page 112, a schedule_listing block 114, and a description block 116. The blocks 114 and 116 together form a page of data (e.g., page m). The blocks 132 and 134 also form a page (e.g., page n). The blocks are sub-pages since they are subsets of a complete page. Furthermore, each block includes one or more data segments, as discussed below. Each page of blocks within each transmission cycle describes the programming available for a given service in a specific time period. For example, the blocks 114 and 116 of the first transmission cycle 110 may describe the programs that are available in the time period 6 p.m. to 10 p.m. of a given day, while blocks 132 and 134 of the first transmission cycle 110 may describe the programs that are available in a different time period. Intermediate blocks will consequently correspond to the programming in intermediate time periods. The time period that is spanned by a transmission cycle is known as the lookahead period. The time period spanned by a page is known as a time slot.

The pages include data that is used to provide a graphical display for the IPG. Specifically, the foundation pages 112, 136, and 156 of the transmission cycles 110, 130 and 150, respectively, include untimed, globally applicable data which indicates the program theme class (e.g., music, sports, movies), program format attribute names (e.g., stereo, black and white), programming source names (e.g., NBC, HBO), Huffman tables for use in data decompression, and so on. The schedule_listing blocks 114, . . . , 132, 138, . . . , 152 and 158, . . . , include the names of the available programs, and the description blocks 116, . . . , 134, 140, . . . , 154, 160, . . . include additional information regarding the programs, such as ratings, featured performers, and so on. Alternatively, an IPG page may include only one block which provides only the information on program names.

However, it is problematic that, at any given moment, different viewers will want to view IPG data for different programs and time slots which may correspond to different pages of the data stream. Furthermore, typically the receiver buffer will not be large enough to hold an entire page of IPG data. Thus, forcing the receiver to retrieve the data of a given program/time slot all at once would cause an overflow condition.

Accordingly, the IPG data pages are segmented for delivery to the receivers. Preferably, each segmented page carries the same amount of data, e.g., 1,024 bytes (one kilobyte). The data segments can then be shuffled to meet the hardware limitations (e.g., bandwidth) of the receivers while minimizing the time the viewer must wait to view the IPG data. For example, the data stream rate may be 1.5 megabits per second (Mbps), but a receiver may have a maximum bandwidth of 0.15 Mbps. The full message will be reconstructed by the receiver only after all segments have been received.

The segmentation approach is an "M of N" scheme involving three parameters; specifically, a "table extension" number, a count of the total number of segments (N) in the message (e.g., block), and an indication of which segment number (M) the message carries. It is possible to define for any single message type more than one table or message image. The table extension field separates one message from another. In this segmentation approach, all segments of the same message must be of equal length, even if the last segment must be padded with null bytes. The length should be as large as possible without exceeding a predetermined maximum based on the receiver's input buffer size (e.g., 1,024 bytes). Thus, if N is the number of segments in a message, there will be at most N-1 null bytes needed.

Furthermore, since the size of each message segment is equal, the RAM required to hold the whole image of the message body may be computed by simply multiplying the message body length in any received segment by the total number of segments. For example, with one kilobyte per segment and twenty segments for a given message, the total image size will be twenty kilobytes.

In general, the computation of N and the segment size involves finding a value of N such that the size of each segment is the maximum possible provided that it does not exceed one kilobyte. Note also that the computation of the RAM size needed to store the whole image may be a few bytes larger than the actual size of the full message due to the need to find an integer number of segments.

Upon receipt of any of the various segments of a message, the receiver may allocate RAM to build an image of a reassembled message, fill in the message header, which precedes the message body, and fill in one fraction (e.g., one Nth) of the message body. When another segment arrives, another portion of the message body is defined, until all parts are received.

In the segment shuffling scheme according to the present invention, assume there are I pages to be delivered in each transmission cycle. Each of the blocks carried in the pages is segmented as described. Next, an integer Z is found such that $Z=\max\{Z_1, \ldots, Z_I\}$, where $Z_i$, $1 \leq i \leq I$, is the number of segments into which the blocks on page i are divided. For instance, if page i contains both a schedule_listing block and a description block which are segmented into 10 and 15 segments, respectively, then $Z_i=10+15=25$. Next, the integer d in the range $0 \leq d < Z$ is determined such that Z divides X, where $X=(Z_1+ \ldots +Z_I+d)$; that is, X/Z=Y for some integer Y.

The Y-shuffle is then performed as described on the X segments, where the last d segments are dummy segments, and the resulting shuffled segments are compacted by deleting the dummy segments. Note that the shuffle operation does not spread out data segments between two adjacent pages, and therefore relies on the fact any two adjacent pages will be acquired using different packet identifiers (PIDs) in the respective headers.

Figure 2:
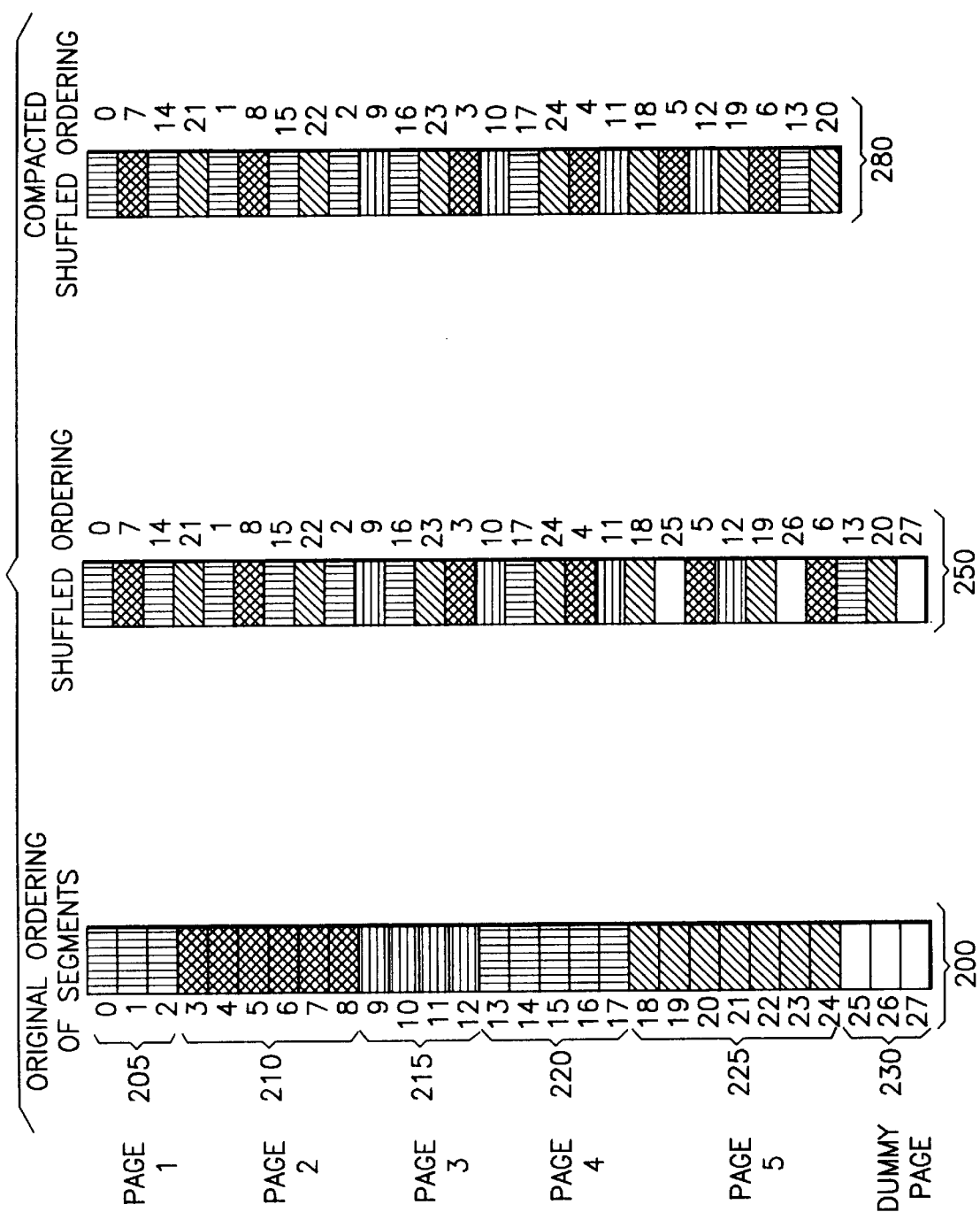
FIG. 2 shows the segmenting of five data pages into twenty five data segments, and the shuffled ordering of the twenty five data segments in accordance with the present invention.

FIG. 2 shows the segmenting of five data pages into twenty five data segments together with three dummy segments, and the shuffled ordering of the twenty five data segments in accordance with the present invention. In this example, the demand IPG data is carried on five pages, including one foundation page and four schedule pages. Note that the pages are ordered sequentially. The five data pages, and one dummy page, are ordered as shown at 200 with the first segment being at the top of the sequence such that the schedule pages are in ascending order. The shuffled ordering of the segments is shown at the data sequence 250.

A schedule page may include only schedule_listing blocks and segments, or both schedule_listing and description blocks and segments. For simplicity, FIG. 2 does not show the distinction between the two types of segments. As shown earlier, if both types of segments are present in a page, then the schedule_listing segments should precede the description segments. Using the segmentation approach discussed, pages one, two, three, four and five are segmented into three, six, four, five and seven segments, respectively. Thus, $Z=\max\{Z_1, Z_2, Z_3, Z_4, Z_5\}=\max\{3, 6, 4, 5, 7\}=7$.

In particular, the first page, shown at 205, which is the foundation page, includes segments 0–2; the second page, shown at 210, includes segments 3–8, the third page, shown at 215, includes segments 9–12, the fourth page, shown at 220, includes segments 13–17, the fifth page, shown at 225, includes segments 18–24, and a dummy page, shown at 230, includes dummy segments 25–27. In this example, d=3 is the smallest integer such that $(Z_1+Z_2+Z_3+Z_4+Z_5+d)$ is divisible by Z=7, with the integer quotient being Y=4. Therefore, X=YZ=28 segments.

The twenty-eight data segments, with the last three (d=3) being dummy segments, are initially arranged as shown at 200. Since Y=4, the 4-shuffle is then performed on the segments, resulting in the shuffled data sequence shown at 250. Finally, the compacted shuffled ordering, shown at 280, is obtained by removing the dummy segments 25–27.

To further illustrate the advantages provided by the shuffled data streams 250 and 280, consider the decoding process where a viewer has entered a command to view an IPG time slot corresponding to page one, shown at 205. Assume further that one segment is carried in the data streams 200 or 250 every $\frac{1}{28}$ second, so that the transmission cycle defined by the twenty-eight segments is one second. Thus, with a receiver that can process segments at a maximum rate of less than 28 segments per second, the receiver would have to wait three full cycles (e.g., three seconds) to retrieve the three adjacent segments of page one with the conventional arrangement of data steam 200.

However, with the shuffled data stream 250 provided in accordance with the present invention, the three segments of page one are separated by three segments of other pages that are not currently of interest to the receiver. Thus, the receiver could retrieve all three segments of page one in a single cycle with a processing rate of only seven segments per second or faster. In fact, the required processing speed of the receiver is reduced by a factor of at least 28/7=4, yet acquisition time is substantially improved. Moreover, note that this represents an ideal case where the three segments are received in three consecutive cycles, respectively. In practical situations, the receiver may keep missing the same segment or segments in each cycle, and therefore fail to receive the complete data for page one.

Figure 3:
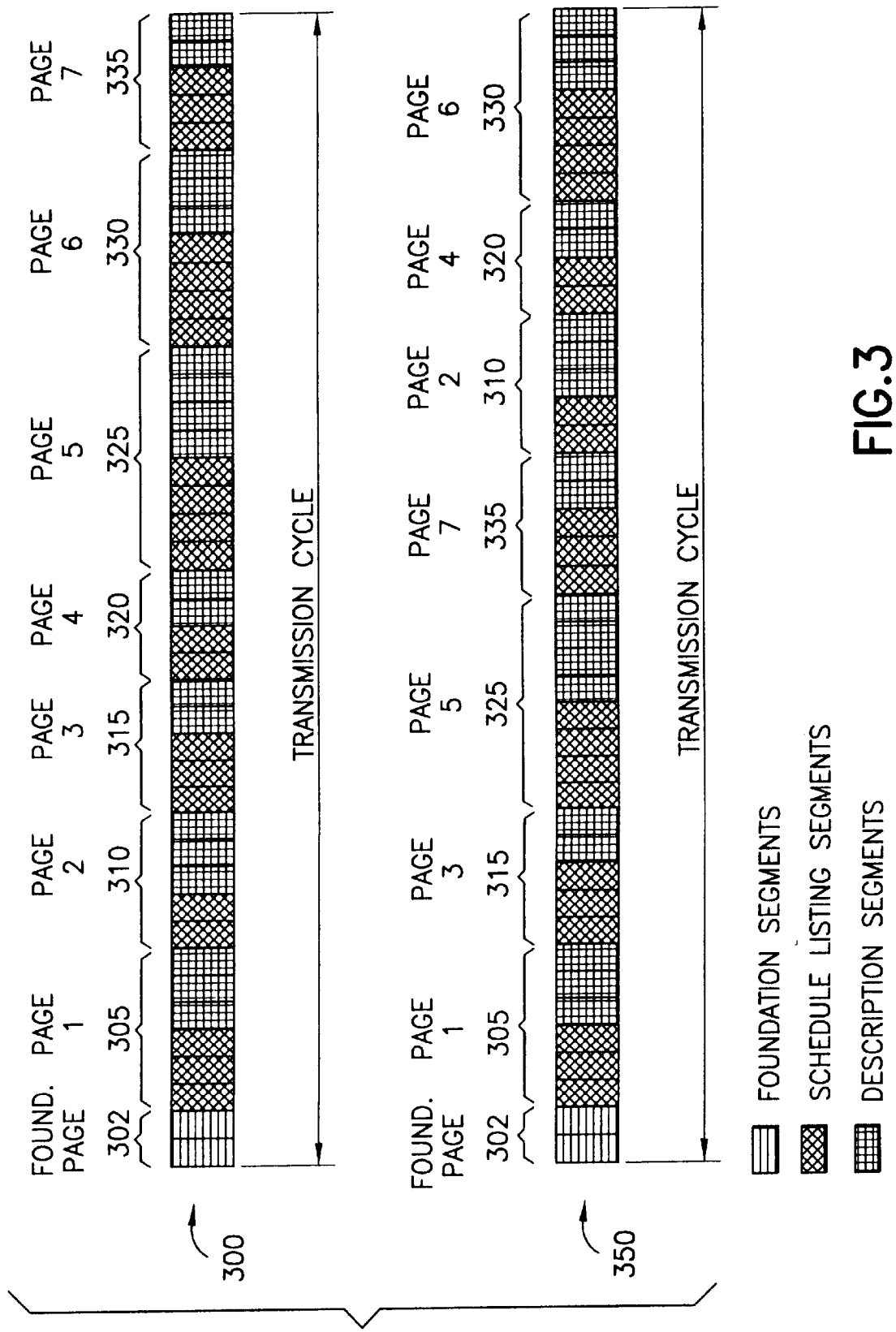
FIG. 3 shows the re-ordering of pages in accordance with the present invention.

FIG. 3 shows the re-ordering of pages in accordance with the present invention. The sequential ordering of schedule pages in the data stream 300 requires that two or more PIDs be used to deliver segmented messages. This is because segment shuffling alone does not place segments from adjacent pages at a distance greater than one. When the desired time slot requires data from two pages to build, two PID filters must be used to acquire the two pages which can be assigned to two different PIDs, respectively. This requirement can be circumvented by ordering the schedule pages in a shuffled fashion where all even numbered pages are arranged before all odd numbered pages, or vice-versa. This can be seen by noting that, without segment shuffling, the segments on the same page are at a distance of one from each other (e.g., the segments are adjacent). With segment shuffling, the segment spacing is increased within a given page. However, segments belonging to pages i and i+1, respectively, may still be at a distance of one. As an example, referring again to FIG. 2, segments 14 and 21, which belong to pages 4 and 5, respectively, in data stream 200 are adjacent to each other in the compacted ordering in data stream 280.

Thus, if the pages are arranged in the simple increasing order page one, page two, page three, and so on, the segments from sequentially neighboring pages may still be at a distance of one even after segment shuffling is performed. In this case, segments from neighboring pages cannot be acquired using the same PID filter. Two or more PIDs would be required to split the data into two streams, with every other page on the same stream, and then one page filter could be used to handle one PID. That is, each page filter would pick up only one of two neighboring pages.

However, if pages are arranged in the order page one, page three, page five, . . . , page two, page four, page six, and so on, sequentially neighboring pages, e.g. pages three and four, will not be adjacent in any transmission cycle. Nor will any segments which were adjacent prior to shuffling be adjacent after shuffling. With this arrangement, one page filter can pick up the neighboring pages from the same PID, and the data stream need not be split.

In particular, consider the sequential ordering of seven schedule pages shown generally at 300. A foundation page is shown at 302. Page one, shown at 305, includes a block of three schedule_listing segments and a block of three description segments, for a total of six segments. Page two, shown at 310, includes a block of two schedule_listing segments and a block of three description segments, for a total of five segments. Page three, shown at 315, includes a block of three schedule_listing segments and a block of two description segments, for a total of five segments. Page four, shown at 320, includes a block of two schedule_listing segments and a block of two description segments, for a total of four segments. Page five, shown at 325, includes a block of four schedule_listing segments and a block of four description segments, for a total of eight segments. Page six, shown at 330, includes a block of four schedule_listing segments and a block of three description segments, for a total of seven segments. Page seven, shown at 335, includes a block of three schedule_listing segments and a block of two description segments, for a total of five segments.

Additionally, the foundation page, shown at 302, is provided at the beginning of the sequence 300. The foundation page 302 and the schedule pages 305–335 together comprise a transmission cycle.

Data sequence 350 shows the re-ordering of data pages in accordance with the present invention. Pages one through seven are reordered in the sequence: page one, page three, page five, page seven, page two, page four, page six. Thus, the odd-numbered pages are provided before the even-numbered pages. The shuffled page ordering works with any number of PIDs. If only one PID is used, two adjacent pages (e.g. pages one and two) must be acquired using the same PID filter.

Figure 4:
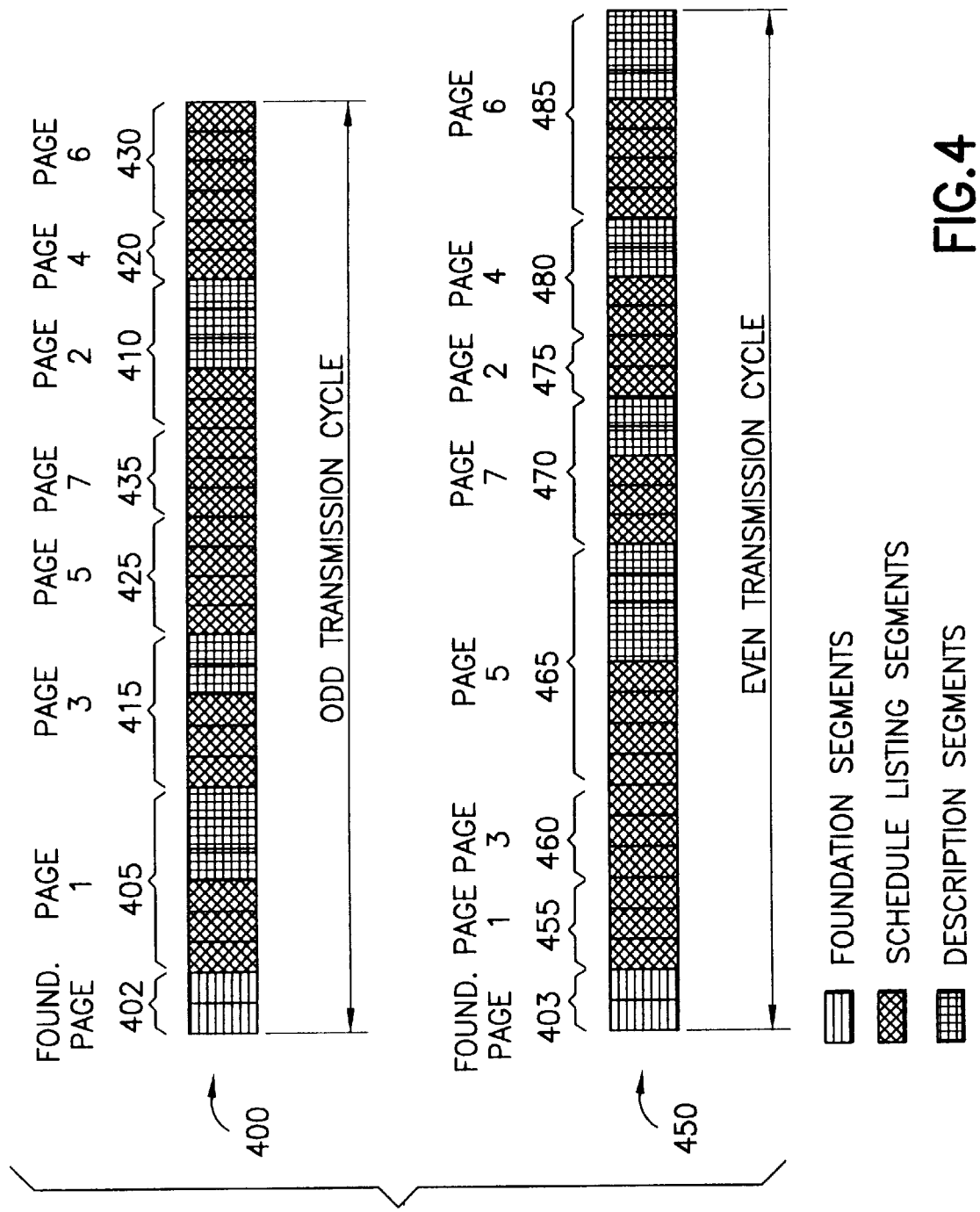
FIG. 4 shows a reduced repetition frequency of description data blocks for transmission in accordance with the present invention.

FIG. 4 shows a reduced repetition frequency of description data blocks for transmission in accordance with the present invention. The data transmitted corresponds to the pages of data sequence 300 of FIG. 3. A block repetition or transmission frequency, F, is defined as the average number of times a given type of data block is sent per transmission cycle. In previous examples, it has been assumed that there is an equal repetition frequency for all data block types. That is, each block, regardless of its type, is transmitted once per cycle. A more general transmission scheme as disclosed herein allows different types of blocks to be transmitted at different frequencies. For example, let $F_d$, $F_t$, and $F_f$ be the repetition frequencies of description, schedule_listing, and foundation pages, respectively. The following relationship shall hold:

$$F_d \leq F_t \leq F_f$$

Further, $F_t$ is equal to one by definition; that is, each of the schedule_listing blocks is transmitted once per transmission cycle. It is desirable, and sometimes necessary, to use different repetition frequencies as the number of channels or database lookaheads increases. For example, with an increased database size, assuming the data transmission rate R remains the same, the program title acquisition time in the receiver can increase proportionally if all block types are transmitted at the same frequency. This undesirable increase in acquisition time can be avoided by transmitting the description data at a lower frequency, in which case only some of the description blocks are transmitted in each cycle. As a result, a consumer will be able to first get program title information relatively quickly, and then acquire program descriptions, if desired. Note that the consumer may not be interested in any descriptions for the first group of program titles displayed, and may instead be interested in viewing additional program titles before making a viewing selection.

Data sequences 400 and 450 show the case where $F_d=\frac{1}{2}$. That is, the description block for each data page is transmitted at a rate of ½ block per transmission cycle, or one block every two transmission cycles. In data sequence 400, the first half of the description blocks are transmitted in odd transmission cycles only. Thus, in a first transmission cycle, the data sequence 400 includes both the schedule_listing blocks and data description blocks of pages one, two and three, shown at 405, 410 and 415, respectively, but only the schedule_listing blocks of pages four, five, six and seven, shown at 420, 425, 430 and 435, respectively. Foundation page 402 is transmitted in the odd cycle, while foundation page 403 is transmitted in the even cycle.

In the even cycle, the description blocks are transmitted for the other half of the pages that were not transmitted in the odd cycle. Thus, for the second transmission cycle, the data sequence 450 includes both the schedule_listing blocks and data description blocks of pages four, five, six and seven, shown at 480, 465, 485 and 470, respectively, but only the schedule_listing blocks of pages one, two and three, shown at 455, 475 and 460, respectively. As can be seen, over the course of several transmission cycles, the schedule_listing blocks will be transmitted at an effective rate of once per transmission cycle, and the description blocks will be transmitted at an effective rate of once every two transmission cycles. Note that the foundation page is transmitted at a rate of once per transmission cycle. Variations on the above scheme are possible, for example, $F_d$ may be set to ⅓, ¼ and so on, and $F_f$ may also vary. Generally, the desired relative acquisition times for different data block types that must be transmitted will determine the appropriate transmission frequencies.

Figure 5:
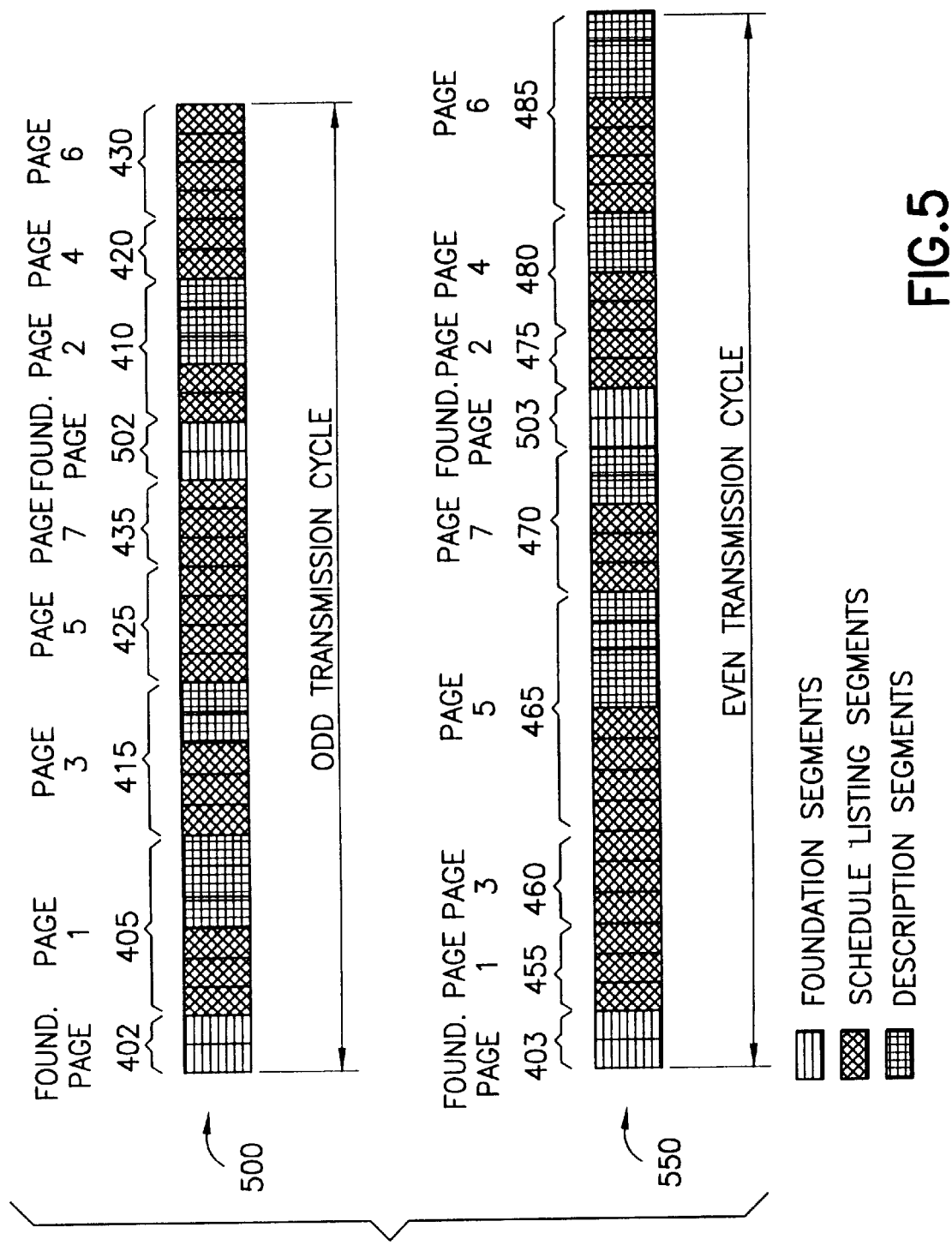
FIG. 5 shows a foundation page for increased repetition frequency in accordance with the present invention.

FIG. 5 shows a foundation page for increased repetition frequency in accordance with the present invention. Since an up-to-date foundation page is indispensable to IPG functioning, it may be desirable to transmit the foundation page more than once per cycle to allow quicker acquisition by the receiver. Data sequence 500 is the same as the odd cycle data sequence 400 of FIG. 4, except that an additional foundation page 502 has been provided between page seven, shown at 435, and page two, shown at 410. Thus, $F_f=2$, since the foundation page is provided at a rate of two pages per transmission cycle. Similarly, data sequence 550 is the same as the odd cycle data sequence 450 of FIG. 4, but an additional foundation page 503 has been provided between page seven, shown at 470, and page two, shown at 475.

Figure 6:
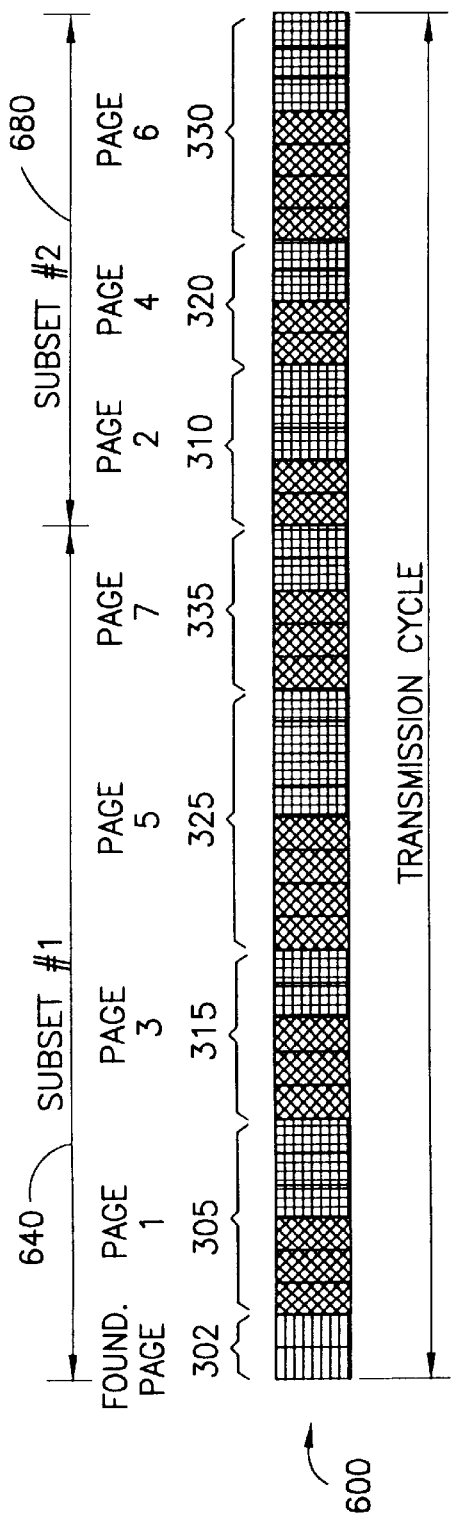
FIG. 6 shows the ordering of a data stream with page partitioning and all block types being transmitted at the same frequency in accordance with the present invention.

FIG. 6 shows the ordering of a data stream with page partitioning and all block types being transmitted at the same frequency in accordance with the present invention. Note that the shuffle approach described previously was applied simultaneously to all data segments. In general, given a set of pre-formatted data pages comprising demand IPG data, the shuffle operation is performed separately on the segments of each subset of pages in order to optimize the inter-segment arrival time. In particular, with page partitioning, the pages within each transmission cycle are divided into G subsets of approximately equal size. In general, $G \geq 1$ with G=1 representing the trivial case where all pages to be delivered within a cycle belong to the same subset. In data sequence 600, G=2, and the sequence comprises a first subset 640 and a second subset 680. Data sequence 600 is the same as the re-ordered sequence 350 of FIG. 3, but the foundation page and pages one, three, five and seven are included in the first subset 640, and pages two, four and six are included in the second subset 680.

Figure 7:
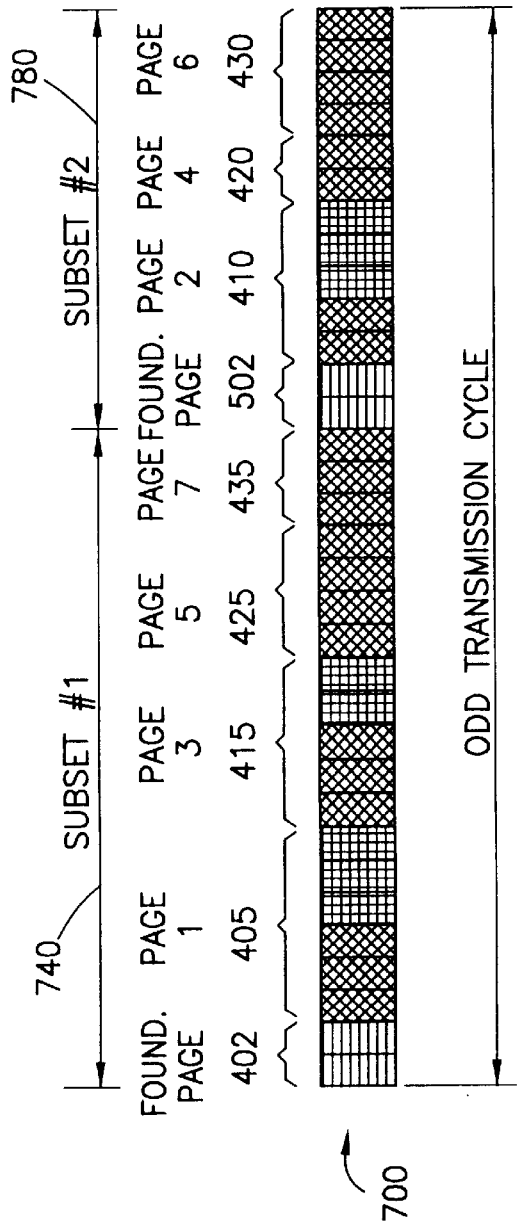
FIG. 7 shows the ordering of a data stream with page partitioning and different block types being transmitted at different frequencies in accordance with the present invention.

FIG. 7 shows the ordering of a data stream with page partitioning and different block types being transmitted at different frequencies in accordance with the present invention. Here, data sequence 700 is the same as sequence 500 of FIG. 5, but the foundation page and pages one, three, five and seven are included in the first subset, and the foundation page and pages two, four and six are included in the second subset.

Other page partitioning variations are possible. A number of subsets may be provided in each transmission cycle, with the block types and transmission frequencies varying within each subset. The purpose of page partitioning is to find an optimal value of the minimum distance D. For a given system configuration (e.g., with specified data rate, database lookahead period and slot size), the minimum inter-segment distance will determine the minimum segment inter-segment arrival time, T. T must correspond to the receiver processing speed, which is measured by the minimum allowed time delay, $T_d$, between two data segments of the same page.

An optimal distance is a distance that gives the smallest T such that $T \geq T_d$. For example, assume the minimum allowed delay time for the receiver is $T_d=50$ milliseconds (msec). Then, if two partitions result in T=212 msec and 100 msec, respectively, then the second partition is preferred. If two further partitions produce 70 and 40 msec inter-segment arrival times, respectively, the partition corresponding to 70 msec is considered optimal. The 40 msec inter-segment arrival time is unacceptable since it is incompatible with the processing speed of the receiver. A partition that results in an optimal inter-segment distance is therefore an optimal partition. Using optimal partitioning improves the best acquisition time in the receiver without increasing the worst case time, where the acquisition time of different pages may vary, for example, due to varying page sizes. In practice, a sub-optimal partitioning may have to be used which gives a distance greater than the minimum allowed receiver delay time, $T_d$ in order to account for variations in the data stream, communication channel and/or the receiver.

Figure 8:
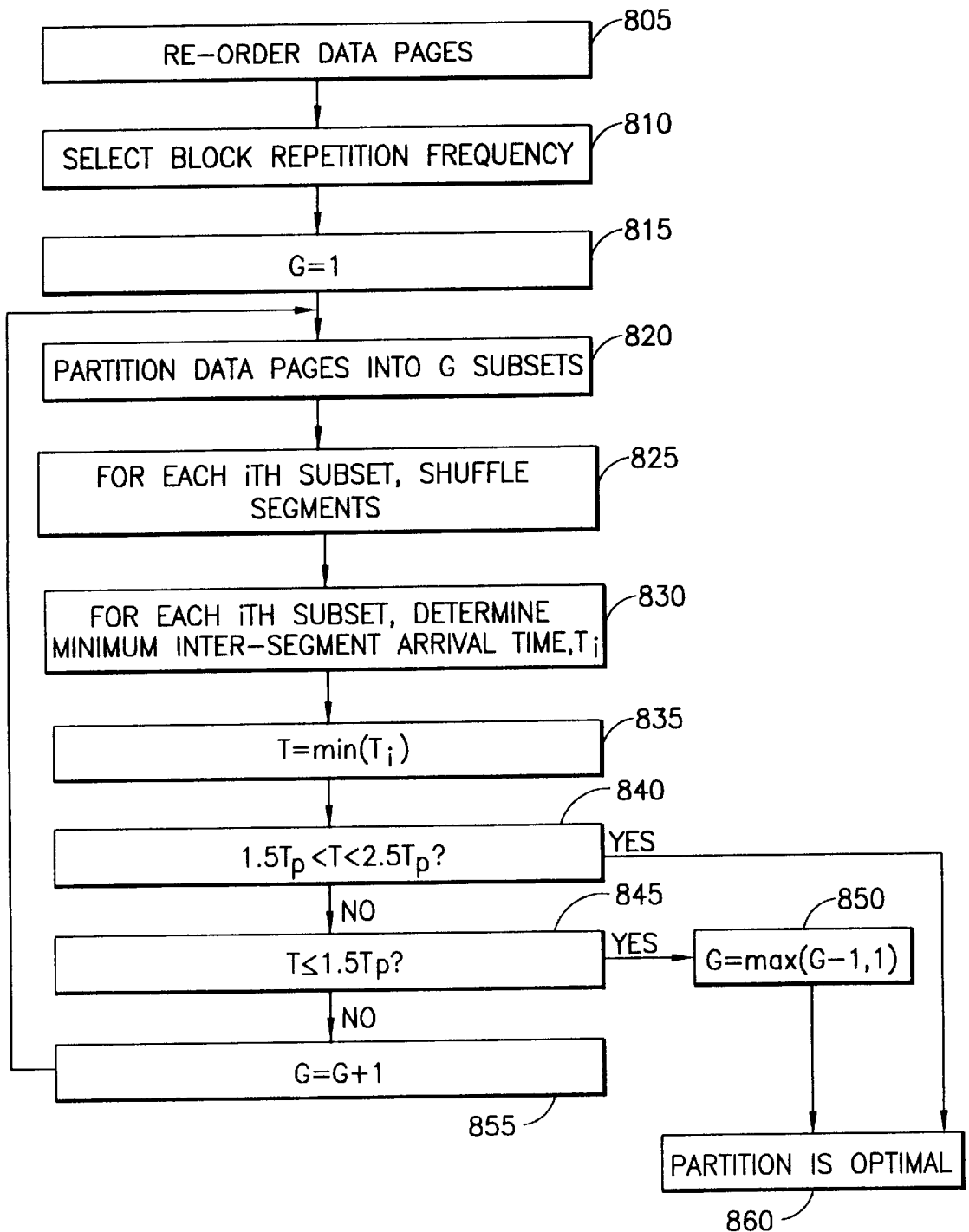
FIG. 8 shows the procedure for optimizing inter-segment arrival time in accordance with the present invention.

FIG. 8 shows the procedure for optimizing inter-segment arrival time in accordance with the present invention. The inter-segment arrival time is optimized by finding an optimal page partition, and then shuffling the segments within each subset of pages. The optimization is performed at the startup of the IPG system and after changing any IPG system configuration parameter such as data rate, database lookahead period, or slot size. First, at block 805, the data pages of the transmission cycle are re-ordered to separate the odd- and even-numbered pages. At block 810, the repetition frequency for the different block types is selected. At block 815, the number of subsets G is set to one. Blocks 805–815 thus define initialization steps. At block 820, the data pages are partitioned into G subsets of approximately equal size. At block 825, for each ith subset, the data segments are shuffled. That is, shuffling is performed separately within each subset. Note that each subset of pages may have a different number of data segments.

At block 830, the minimum inter-segment arrival time, $T_i$, is determined for each of the G subsets, as will be discussed below. At block 830, T, the smallest of the G minimum inter-segment arrival times is determined such that $T = \min\{T_i\}$ for $1 \leq i \leq G$. At block 840, if $1.5\, T_d < T < 2.5 T_d$, where $T_d$ is the minimum receiver interval, then the corresponding partition is considered optimal at block 860. Otherwise, if $T \leq 1.5 T_d$, at block 845, then the number of subsets G is decremented by 1 at block 850 to achieve an optimal partition at block 860. At block 850, the maximum of G-1 and one is taken. Otherwise, the number of subsets G is incremented by one at block 855, and the data pages are again partitioned into G subsets at block 820.

Note that the above procedure assumes that $T_d$, the minimum receiver interval, is known. However, the process may be modified in an experimental procedure if $T_d$ is not known. Specifically, G can be incremented in each pass as shown in FIG. 8, and the receiver can be monitored to ensure that it is still able to acquire the data segments. When, G is increased to a level, e.g., $G_k$, where the receiver can no longer acquire the data segments because the inter-segment arrival time, T, is too small, then the optimal partition will correspond to $G = \max\{G_k - 2, 1\}$. For example, if $G_k = 5$, then G=3 subsets is an optimal partition.

With the optimizing procedure of FIG. 8, the inter-segment arrival time can be estimated as follows. The estimation is a simplified illustration, and may vary from an actual implementation. The following variables are used in the calculations and descriptions:

L Lookahead period (days)
S Slot size (hours)
D Minimum distance between any two consecutive segments defining the same time slot; typically D<D' (segments)
R Demand data transmission rate (Mbps)
$T_k$ Time required to transmit 1 Mb of data (msec)
T Minimum time delay between the arrival of any two consecutive segments defining the same time slot (msec)

For a data stream with no partitioning, refer again to the data sequence 350 of FIG. 3, where the transmission cycle defines one subset. The sequence 350 includes one foundation page and seven data pages, pages one, three, five, seven, two, four and six. Assume further that the seven pages contain programming data for a seven day period, with each page corresponding to the programming of a different day. Then, the lookahead period L=7 days, the slot size is S=24 hours, and there are seven demand data pages (ignoring the foundation page) in each transmission cycle.

In the data sequence 350, since there are seven data pages, one for each day of programming, ideally a 7-shuffle would be performed on the data segments, giving a minimum intersegment distance D'=7. However, D' may be reduced by one segment when dummy segments are provided in the original data sequence, as in the example of FIG. 2, where three dummy segments 25–27 were added to the data sequence 200. Furthermore, D' must be reduced by at least another data segment when the pages have different sizes, as with the data sequence 350, where page one, shown at 305, contains six segments, page two, shown at 310, contains five segments, page three, shown at 315, contains five segments, page four, shown at 320, contains four segments, page five, shown at 325, contains eight segments, page 6, shown at 330, contains seven segments, and page 7, shown at 335, contains five segments.

Thus, for the data sequence 350 of FIG. 3, D=D'-1-1= 7-1-1=5 segments. Furthermore, assuming a data rate of 1.5 Mbps (e.g., R=1.5) and a size of one kilobyte for each segment, then the time to transmit one kilobyte of data is $T_k = 8$ bits/byte/R=8/1.5=5.3 msec. Thus, the inter-segment arrival time is T=D $T_k$=5×5.3 msec=26.5 msec.

Now consider the case where each page contains data for scheduling of a four-hour time slot. Here, forty-two pages would be required to provide IPG date for seven days, since 7 days×24 hours/day/4 hours/page=42 pages. Thus, the minimum distance D'=42, and D=D'-1-1=40. The corresponding inter-segment arrival time is T=D $T_k$=40×5.3 msec=212 msec.

Table 1 below shows the results for different data rates and slot sizes. As can be seen, with a fixed number of data segments in a transmission cycle, the inter-segment delay, T, will increase proportionately as the time slot size S decreases.

TABLE 1

Inter-Segment Arrival Time Estimates: No Page Partitioning, Same Block Repetition Frequency

| L (days) | R (Mbps) | S (hours) | D (segments) | T (msec) |
|---|---|---|---|---|
| 7 | 1 | 4 | 40 | 320 |
| | | 6 | 26 | 208 |
| | | 8 | 19 | 152 |
| | | 12 | 12 | 96 |
| | | 24 | 5 | 40 |
| | 1.5 | 4 | 40 | 212 |
| | | 6 | 26 | 137.8 |
| | | 8 | 19 | 100.7 |
| | | 12 | 12 | 63.6 |
| | | 24 | 5 | 26.5 |
| | 2.0 | 4 | 40 | 160 |
| | | 6 | 26 | 104 |
| | | 8 | 19 | 76 |
| | | 12 | 12 | 48 |
| | | 24 | 5 | 20 |

For a data stream with partitioning, the inter-segment arrival time is reduced. For example, consider the data sequence 600 of FIG. 6. The transmission cycle is partitioned into two subsets 640 and 680, and all block types are transmitted at the same frequency. When the data pages contain IPG data for a twenty-four hour time slot (S=24), for the first subset 640, there are four pages, with D'=4, but for the second subset 680 there are only three pages, with D'=3. Since the lesser of the inter-segment distances is the constraining factor, D'=3 must be used for the entire transmission cycle. Thus, D=D'-1-1=3-1-1=1. Since, with R=1.5 Mbps, it takes $T_k$=5.3 msec to transmit one megabyte of data (e.g., one segment), the inter-segment arrival time is T=D $T_k$=1×5.3 msec=5.3 msec.

For an S=4 hour time slot, again a total of forty-two pages would be required to provide IPG date for seven days. The forty-two pages are allocated equally, with twenty-one pages in the first subset 640 and twenty-one pages in the second subset 680, so the minimum distance D'=21, and D=D'−1−1=19. The inter-segment arrival time is T=D $T_k$=19×5.3 msec=100.7 msec. Table 2 below shows the results for different data rates and slot sizes.

Note that, in general, it is desirable to partition the transmission cycle pages as evenly as possible so that each subset has approximately the same number of pages since this will yield the largest D'. For example, if the forty-two data pages with the four-hour time slot were allocated in proportion to the original distribution, e.g., in the proportion of 4:3, a non-optimal partitioning would result. Specifically, in this non-optimal case, the first subset 640 would include 4×6=24 pages, and the second subset 680 would include 3×6=18 pages. Then, D' would be the lesser of 24 and 18, or D'=18. As discussed, with other factors being the same, a larger minimum inter-segment distance D' is desirable since it yields a larger inter-segment arrival time.

TABLE 2

Inter-Arrival Time Estimates: Pages Partitioned into 2 Subsets, Same Repetition Frequency.

| L (days) | R (Mbps) | S (hours) | D (segments) | T (msec) |
|---|---|---|---|---|
| 7 | 1 | 4 | 19 | 152 |
|  |  | 6 | 12 | 96 |
|  |  | 8 | 8 | 64 |
|  |  | 12 | 5 | 40 |
|  |  | 24 | 1 | 8 |
|  | 1.5 | 4 | 19 | 100.7 |
|  |  | 6 | 12 | 63.6 |
|  |  | 8 | 8 | 42.4 |
|  |  | 12 | 5 | 26.5 |
|  |  | 24 | 1 | 5.3 |
|  | 2.0 | 4 | 19 | 76 |
|  |  | 6 | 12 | 48 |
|  |  | 8 | 8 | 32 |
|  |  | 12 | 5 | 20 |
|  |  | 24 | 1 | 4 |

For the case with different block repetition frequencies and no page partitioning, refer again to data sequence 500 of FIG. 5. Here, there are data segments of seven pages in each transmission cycle, ignoring the foundation data. Moreover, three of the pages each carry both schedule_listing and description blocks, and the other four pages each include only schedule_listing blocks. Specifically pages one, two and three, shown at 405, 410 and 415, respectively, each carry both schedule_listing and description blocks, and pages four, five, six and seven, shown at 420, 425, 430 and 435, respectively, each carry only schedule_listing blocks.

For example, assume a twenty-four hour time slot (S=24) and a seven day lookahead period (L=7). Assume also that the schedule_listing and description blocks are of the same size. Then, for the purpose of segment shuffling, pages four, five, six and seven can together be treated as two pages which effectively each carry both schedule_listing blocks and description blocks. Therefore, for the entire transmission cycle, D'=3+4/2=5 segments and D=D'−1−1=3. With R=1.5 Mbps and $T_k$=5.3 msec, the corresponding inter-segment arrival time is T=D $T_k$=3×5.3 msec=15.9 msec.

For the case with a four hour slot size (S=4), there will be a total of forty-two pages, twenty-one of which can be allocated to pages one, two and three, and 21/2 of which can be allocated to pages four, five, six and seven. Thus, for the entire data sequence 500, D'=21+21/2≈31 and D=D'−1−1=29, and the inter-arrival time with R=1.5 Mbps is T=D $T_k$=29×5.3 msec=153.7 msec. Table 3 shows the results for different data rates and slot sizes.

TABLE 3

Inter-Arrival Time Estimates: No Page Partitioning, Different Repetition Frequencies

| L (days) | R (Mbps) | S (hours) | D (segments) | T (msec) |
|---|---|---|---|---|
| 7 | 1 | 4 | 29 | 232 |
|  |  | 6 | 19 | 152 |
|  |  | 8 | 13 | 104 |
|  |  | 12 | 8 | 64 |
|  |  | 24 | 3 | 24 |
|  | 1.5 | 4 | 29 | 153.7 |
|  |  | 6 | 19 | 100.7 |
|  |  | 8 | 13 | 68.9 |
|  |  | 12 | 8 | 42.4 |
|  |  | 24 | 3 | 15.9 |
|  | 2.0 | 4 | 29 | 116 |
|  |  | 6 | 19 | 76 |
|  |  | 8 | 13 | 52 |
|  |  | 12 | 8 | 32 |
|  |  | 24 | 3 | 12 |

For the case with different block repetition frequencies and page partitioning, refer again to data sequence 700 of FIG. 7. Data sequence 700 includes a first subset 740 and a second subset 780. For a twenty-four hour time slot (S=24), the first subset 740 includes four pages, again ignoring the foundation page 402. The second subset 780 includes three pages, one of which carries both schedule_listing and description blocks (e.g., page two, shown at 410), and two of which each carry only description blocks (e.g., pages four and six, shown at 420 and 430, respectively). Therefore, for the second subset 780, D'=1+2/2=2, and D'−1−1=0. However, by definition, D≧1, thus D=1 is the proper result in this case. In general, in one embodiment of the present invention which employs different block repetition frequencies and page partitioning, approximately half of the pages in a subset will each carry both schedule and description blocks, and the other half of the pages will each carry only a description block.

Thus, for the second subset 780, with R=1.5 Mbps and $T_k$=5.3 msec, the inter-segment arrival time is T=D $T_k$=1×5.3 msec=5.3 msec. The inter-segment arrival time for the first subset 740 can be determined similarly.

For the case with four-hour time slots, again there will be forty-two pages, with twenty-one carried by the first subset 740, and twenty-one carried by the second subset 780. Based on the above reasoning, the twenty-one pages carried in the second subset 780 will include ten segments which carry both schedule and description blocks, and eleven segments which carry only description blocks. Thus, D'=10+11/2≈10+5=15 and D=D'−1−1=13, and the inter-segment arrival time is T=D $T_k$=13×5.3 msec=68.9 msec. Table 4 shows the results for different data rates and slot sizes.

TABLE 4

Inter-Arrival Time Estimates: Pages Partitioned into 2 Subsets, Different Repetition Frequencies.

| L (days) | R (Mbps) | S (hours) | D (segments) | T (msec) |
|---|---|---|---|---|
| 7 | 1 | 4 | 13 | 104 |
|   |   | 6 | 8 | 64 |
|   |   | 8 | 5 | 40 |
|   |   | 12 | 3 | 24 |
|   |   | 24 | 1 | 8 |
|   | 1.5 | 4 | 13 | 68.9 |
|   |   | 6 | 8 | 42.4 |
|   |   | 8 | 5 | 26.5 |
|   |   | 12 | 3 | 15.9 |
|   |   | 24 | 1 | 5.3 |
|   | 2.0 | 4 | 13 | 52 |
|   |   | 6 | 8 | 32 |
|   |   | 8 | 5 | 20 |
|   |   | 12 | 3 | 12 |
|   |   | 24 | 1 | 4 |

In regard to the various assumptions made in calculating the inter-segment arrival times above, note that each data segment was assumed to be one kilobyte long. If the segment length is actually smaller, the inter-segment arrival time will be shorter. Furthermore, the above examples assumed that the different pages had unequal, but similar sizes, which resulted in a reduction of inter-segment distance by one from D', the number of pages (e.g., time slots) within the lookahead period, L. If this is not the case, for example, when one of the pages is much larger than the others, the distance D may be reduced further. Furthermore, the results in Table 4 assume a description block to be of the same size as a schedule_listing block. This may vary in a real database.

Figure 9:
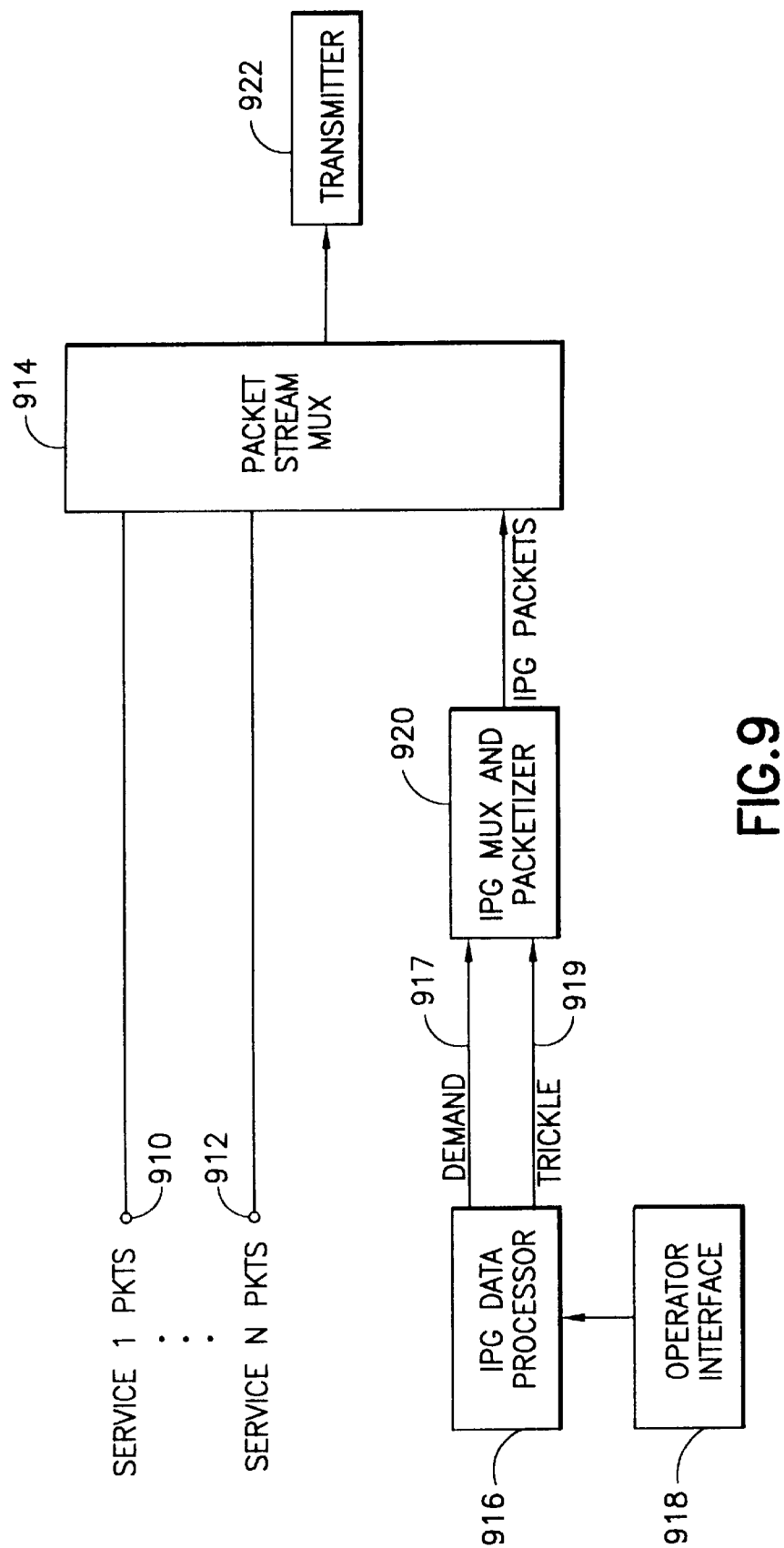
FIG. 9 is a block diagram of an apparatus for transmitting IPG data in accordance with the present invention.

FIG. 9 is a block diagram of an apparatus for transmitting IPG data in accordance with the present invention. In particular, the encoder apparatus shown may be used for assembling and transmitting interactive program guide (IPG) packets in a multiplex with various programming services to be provided over a communication network. A packet stream multiplexer 914 receives data packets for N different services that are input to the multiplexer via a plurality of terminals 910, 912. IPG packets are also input to the packet stream multiplexer 914 for multiplexing with the data packets for the different services after processing in accordance with the present invention. The packet stream multiplex output from multiplexer 914 is transmitted over the communication network by a conventional transmitter 922. The communication network can comprise, for example, a satellite communication network, a cable television network or a telephone network.

IPG scheduling information is input to an IPG data processor 916 via an operator interface 918. The operator interface can comprise, for example, a workstation having a keyboard through which an operator inputs various scheduling information. The scheduling information is typically organized by time slots within a particular day. The time slots can be any size, for example two, four, six, eight or twelve hours. For each event, a title can be provided together with the time at which the event is available. A description of the event can also be provided as part of the IPG data input via the operator interface.

In accordance with the present invention, the IPG processor performs the steps set forth in FIG. 8, and outputs both a demand data stream 917 and a trickle data stream 919. In particular, the demand data stream comprises shuffled data segments which are provided in a plurality of data pages. Furthermore, the data pages may be arranged in subsets in the data stream. As mentioned, the trickle stream is a low rate IPG stream that is used to improve the responsiveness and user friendliness of the program guide function by ensuring that the memory in a subscriber's receiver always holds a database which is up-to-date for current programming. Moreover, whenever a user desires to view a portion of the program guide database that is not stored in the receiver memory, the desired portion is acquired from the high speed demand stream. Thus, trickle data does not need to be present for programs scheduled farther in the future than can be held in the available receivers having the largest IPG RAM allocation. All other data is provided via the demand stream.

To simplify implementation, it is preferable for the trickle stream to be formatted and constructed the same as the demand stream(s). However, there is no need to process the trickle data stream in accordance with the scheme of the present invention since it is provided at a much lower rate than the demand data stream. Data blocks received from the trickle stream are filtered in firmware at the receiver to reject those representing data farther in the future than the particular receiver's RAM can hold. It is also preferable to provide only one trickle stream per multiplex, with all of the current scheduling data being carried in that single stream. The demand data, on the other hand, may be provided in a plurality of different data streams carried in the multiplex output from packet stream multiplexer 914.

The trickle and demand streams are output separately from the IPG data processor 916, then multiplexed together and packetized in an IPG multiplexer and packetizer 920. The resultant IPG packets are input to the packet stream multiplexer 914 and combined with the packets for the various programming services carried in the transmitted multiplex.

By providing the most current schedule information (e.g., the schedules for the current day) in the receiver RAM, this information can be retrieved by a user without delay once the RAM has been loaded. The remaining data in the schedule database, i.e., the demand data, must be retrievable with as small a delay as reasonably possible within the constraints of system cost and complexity. Thus, if a user selects a time period of interest in the future, he must be able to see the program grid for the future time period (containing the schedule of events for that time period) in as short a time as possible. This time should not exceed several seconds. The program description information should be available no more than several seconds later (e.g., one to three seconds) for programs whose titles are visible on the screen. The necessary low acquisition time requires the delivery of IPG data not already stored in RAM at a high transmitted rate via the demand data stream.

Figure 10:
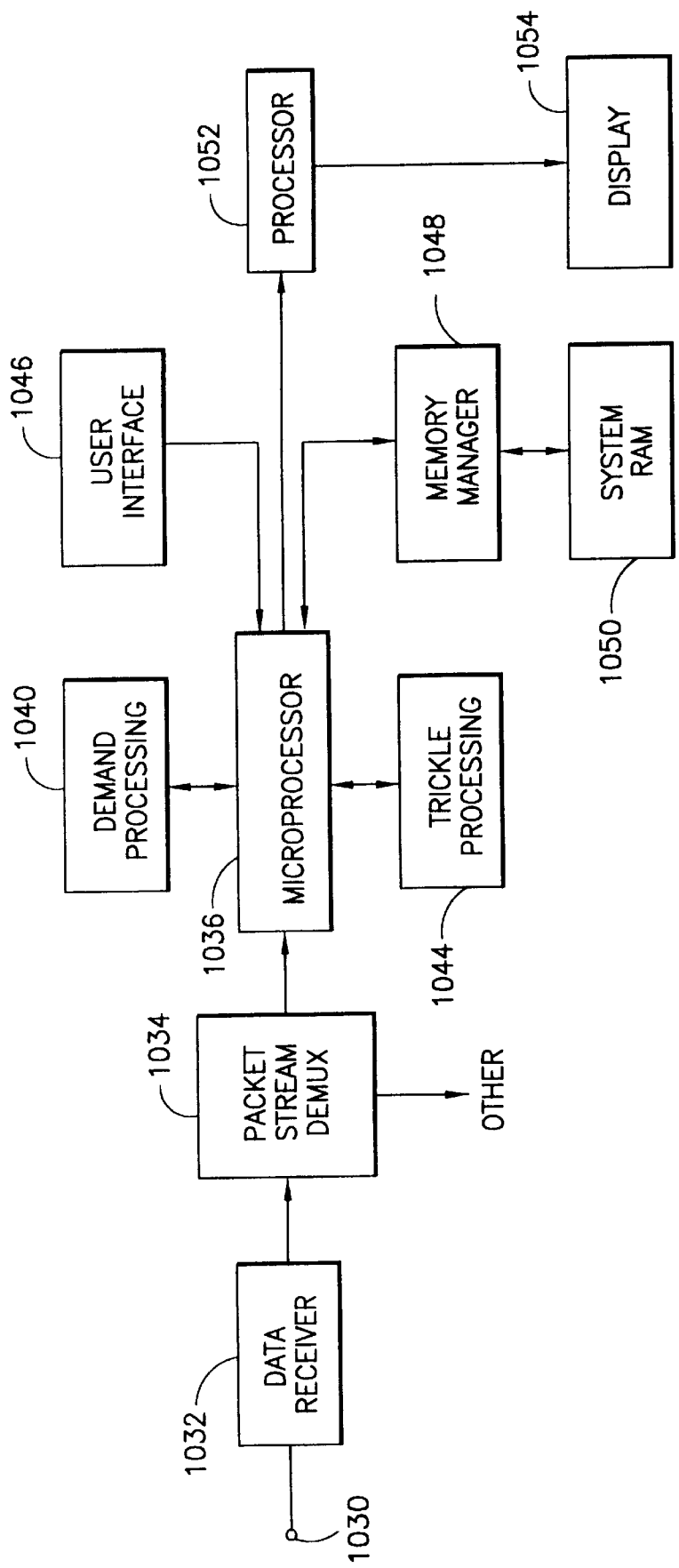
FIG. 10 is a block diagram of an apparatus for receiving IPG data in accordance with the present invention.

FIG. 10 is a block diagram of an apparatus for receiving IPG data in accordance with the present invention. A data receiver 1032 receives the transmitted data stream via an input terminal 1030. The received data is provided to a packet stream demultiplexer 1034 that outputs the demand and trickle IPG data packets to an IPG microprocessor 1036. Other packets in the transport stream, which may include video and audio packets, are also output from the packet stream demultiplexer 1034.

Microprocessor 1036 separately processes the demand and trickle data streams. Processing of the shuffled demand data segments is provided at function 1040. Trickle processing is provided at function 1044. In a preferred embodiment, the demand processing occurs at a much higher rate than the trickle processing. For example, the data rate for the demand stream will be on the order of 1–2 Mbps, while the data rate of the trickle stream will be on the order of ten kilobits per second (Kbps). Since the trickle data is stored locally in the receiver's memory, there is no need for it to be provided in a high rate data stream as it will be instantly accessible from the receiver RAM.

Loading of the trickle data as well as selective portions of the demand data into system RAM 1050 is controlled by a memory manager 1048 coupled to a microprocessor 1036. The memory manager will address the RAM 1050 in a conventional manner to store the trickle and demand data for subsequent retrieval by the microprocessor and display on a monitor 1054 or the like coupled to a video processor 1052. Selection of particular time slots of future scheduling information carried in the demand data stream is made via a user interface 1046. The user interface can comprise, for example, a remote control coupled to input instructions to microprocessor 1036.

One function of memory manager 1048 is to monitor the amount of free memory available in the system RAM 1050. In the event that the amount of memory available is less than that required to store the title and description records for a time slot of interest, the memory manager can purge description records from the system RAM in order to make room for all of the title records. In this manner, the title information will be immediately available to a user once it has been downloaded into the system RAM. If there is not enough room to store the corresponding description information, the description record for an event requested by a user can be obtained from the demand data stream on an as needed basis. Since the demand data is transmitted at a high rate, the acquisition time for a requested description not already stored in system RAM 1050 will be fairly short.

Preferably, the amount of system RAM 1050 allocated for IPG data will be enough to hold at least twenty four hours of current schedule information. Thus, schedule information for at least a full day of events at a time can be accommodated. Thus, all of the scheduling information for at least the current day's events may be provided in the trickle data stream for downloading into system RAM 1050.

When the data carried by the demand and trickle streams is provided in separate pages, and each of the pages is carried in a separate packet stream identified by a unique PID in the transport multiplex, microprocessor 1036 can provide first and second PID processors for acquiring schedule information spanning two consecutive time slots. The separate PID processors could be implemented in either hardware or firmware. The first PID processor will acquire schedule information contained in a first page for a first time slot. The second PID processor will acquire schedule information contained in a second page for a second time slot that immediately follows the first time slot. For a given length of time interval for the on-screen display, the time slot size can be selected so that any single screen of display will require no more than two pages of IPG data. The microprocessor will selectively combine portions of schedule information acquired by the first and second PID processors to provide a schedule of events available during a time period spanning the first and second time slots. The combined schedule is output to processor 1052 for display on display 1054.

In order to simplify the processing provided by microprocessor 1036, a service carried on the information network can be divided among a plurality of different data streams, each having its own PID. Processing is simplified in such an embodiment because the individual data rates are smaller. At higher data rates, hardware filtering may also be required.

There are two different types of elementary PIDs which make up the demand IPG download service. One type carries only records describing time slots. The other type carries foundation data. The records describing time slots include daily schedule/title records and description records. For example, the records describing time slots are carried in the form of a "schedule record" that combines title and description information into a daily schedule.

Accordingly, it can be seen that the inter-segment arrival time of IPG data segments in a data stream is determined mainly by data transmission rate R, database lookahead period L, slot size S, the relative sizes of data pages and blocks, and segment lengths. The design criteria is to select the minimum inter-segment arrival time, T, that does not exceed the acquisition capability of the receiver. The present invention allows adjustment of various criteria, including the time slot duration and number of pages per transmission cycle, in order to arrive at an optimal solution. Furthermore, the present invention provides different formatting options regarding the partitioning of pages and the transmission frequency of different types of data blocks or segments in a page.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for communicating a data stream which includes a plurality of data segments to at least one receiver, comprising the step of:

shuffling said segments from a first segment order, in which adjacent ones of the segments are ordered in accordance with a graphical display order, to provide said segments in said data stream in a second segment order that is arranged to accommodate a maximum speed at which said at least one receiver can receive data.

2. The method of claim 1, wherein:

in said second segment order, respective pairs of segments which were adjacent in said first segment order are separated by corresponding inter-segment distances; and said shuffling step maximizes a minimum of said inter-segment distances such that a data rate corresponding to the minimum inter-segment distance is within said maximum speed.

3. The method of claim 1, wherein said data segments are arranged as a plurality of pages in a first page order which corresponds to said first segment order, comprising the further step of:

providing said pages in said data stream in a second page order such that alternate pages in said first page order are grouped in said second page order.

4. The method of claim 1, wherein said data segments are grouped in a plurality of blocks including at least first and second types of blocks, comprising the further step of:

arranging said first and second types of blocks over a first transmission cycle of said data stream and subsequent transmission cycles which follow thereafter such that said first and second types of blocks are provided at different respective frequencies in said data stream.

5. The method of claim 1, wherein said data segments are arranged as a plurality of pages in a first page order which corresponds to said first segment order, comprising the further step of:

partitioning said plurality of pages into at least first and second subsets thereof; wherein:

said shuffling of segments occurs separately within each of said subsets.

6. The method of claim 5, wherein in said second segment order, respective pairs of segments which were adjacent in said first segment order are separated by corresponding inter-segment distances; and said shuffling step maximizes the minimum of said inter-segment distances for each of said subsets.

7. The method of claim 6, comprising the further steps of:

determining a characteristic inter-segment arrival time which corresponds to the minimum of said inter-segment distances of said subsets; and determining whether said characteristic inter-segment arrival time is within said maximum speed of said at least one receiver.

8. The method of claim 1, wherein:

the maximum speed of the at least one receiver is a function of at least one of an input buffer size and a processing speed.

9. The method of claim 1, wherein:

the data segments comprise television program guide data.

10. The method of claim 1, wherein:

said data segments are arranged as a plurality of pages; and each page comprises an associated graphical image for a television program guide.

11. The method of claim 3, wherein:

the plurality of pages are arranged sequentially in said first page order, and odd-numbered pages are grouped with one another, and even-numbered pages are grouped with one another, in said second page order.

12. The method of claim 3, wherein:

said second page order enables the plurality of pages to be carried in the data stream according to a common packet identifier.

13. The method of claim 3, wherein:

in the second page order, data segments from neighboring pages in said first page order are carried in non-adjacent pages.

14. The method of claim 4, wherein:

the plurality of blocks comprise at least one of foundation blocks, schedule listing blocks, and description blocks for a television program guide.

15. The method of claim 14, wherein:

the frequency of the description blocks in the data stream is less than the frequency of the schedule listing blocks.

16. The method of claim 14, wherein:

the frequency of the foundation blocks in the data stream is greater than the frequency of the schedule listing blocks.

17. An apparatus for communicating a data stream which includes a plurality of data segments to at least one receiver, comprising:

means for shuffling said segments from a first segment order, in which adjacent ones of the segments are ordered in accordance with a graphical display order, to provide said segments in said data stream in a second segment order that is arranged to accommodate a maximum speed at which said at least one receiver can receive data.

18. The apparatus of claim 17, wherein:

in said second segment order, respective pairs of segments which were adjacent in said first segment order are separated by corresponding inter-segment distances; and said shuffling means maximizes a minimum of said inter-segment distances such that a data rate corresponding to the minimum inter-segment distance is within said maximum speed.

19. The apparatus of claim 17, wherein said data segments are arranged as a plurality of pages in a first page order which corresponds to said first segment order, further comprising:

means for providing said pages in said data stream in a second page order such that alternate pages in said first page order are grouped in said second page order.

20. The apparatus of claim 17, wherein said segments are grouped in a plurality of blocks including at least first and second types of blocks, further comprising:

means for arranging said first and second types of blocks over a first transmission cycle of said data stream and subsequent transmission cycles which follow thereafter such that said first and second types of blocks are provided at different respective frequencies in said data stream.

21. The apparatus of claim 17, wherein said data segments are arranged as a plurality of pages in a first page order which corresponds to said first segment order, further comprising:

means for partitioning said plurality of pages into at least first and second subsets thereof; wherein:

said shuffling means shuffles said segments separately within each of said subsets.

22. The apparatus of claim 21, wherein in said second segment order, respective pairs of segments which were adjacent in said first segment order are separated by corresponding inter-segment distances; and said shuffling step maximizes the minimum of said inter-segment distances for each of said subsets.

23. The apparatus of claim 22, further comprising:

means for determining a characteristic inter-segment arrival time which corresponds to the minimum of said inter-segment distances of said subsets; and means for determining whether said characteristic inter-segment arrival time is within said maximum speed of said at least one receiver.

24. The apparatus of claim 19, wherein:

the plurality of pages are arranged sequentially in said first page order, and odd-numbered pages are grouped with one another, and even-numbered pages are grouped with one another, in said second page order.

25. The apparatus of claim 19, wherein:

said second page order enables the plurality of pages to be carried in the data stream according to a common packet identifier.

26. The apparatus of claim 19, wherein:

in the second page order, data segments from neighboring pages in said first page order are carried in non-adjacent pages.

27. The apparatus of claim 20, wherein:

the plurality of blocks comprise at least one of foundation blocks, schedule listing blocks, and description blocks for a television program guide.

28. The apparatus of claim 27, wherein:

the frequency of the description blocks in the data stream is less than the frequency of the schedule listing blocks.

29. The apparatus of claim 27, wherein:

the frequency of the foundation blocks in the data stream is greater than the frequency of the schedule listing blocks.

30. The apparatus of claim 17, wherein:

said data segments are arranged as a plurality of pages; and each page comprises an associated graphical image for a television program guide.

31. The apparatus of claim 17, wherein:

the maximum speed of the at least one receiver is a function of at least one of an input buffer size and a processing speed.

32. The apparatus of claim 17, wherein:

the data segments comprise television program guide data.

33. A receiver for processing a data stream which includes a plurality of data segments, said receiver having a maximum speed at which it can receive and process data, comprising:

means for retrieving particular ones of said segments; wherein:

said segments are provided in a shuffled order in accordance with said maximum speed; and said shuffled order is obtained by shuffling the segments from a first segment order in which adjacent ones of the segments are ordered in accordance with a graphical display order.

34. The receiver of claim 33, wherein:

when the data segments are shuffled from the first segment order, respective pairs of segments which were adjacent in said first order are separated by corresponding inter-segment distances in said shuffled order; and a minimum of said inter-segment distances is maximized such that a data rate corresponding to the minimum inter-segment distance is within said maximum speed.

35. The receiver of claim 33, wherein:

said data segments are arranged as a plurality of pages; and said pages are shuffled from a first page order to a second page order which corresponds with said shuffled segment order such that alternate pages in said first page order are grouped in said second page order.

36. The receiver of claim 33, wherein:

said segments are grouped in a plurality of blocks including at least first and second types of blocks; and said first and second types of blocks are arranged in a first transmission cycle of said data stream and subsequent transmission cycles which follow thereafter such that said first and second types of blocks are provided at different respective frequencies in said data stream.

37. The receiver of claim 33, further comprising:

an input buffer having a characteristic capacity for receiving said data stream; and a processor having a characteristic processing speed for processing data received via said input buffer; wherein:

said characteristic capacity and said characteristic processing speed are indicative of said maximum speed.

38. The receiver of claim 33, wherein:

said segments are grouped in a plurality of pages;

said pages are partitioned into at least first and second subsets thereof; and said segments are shuffled separately within each of said subsets.

39. The receiver of claim 38, wherein:

within each of said subsets, said data segments are shuffled from a first segment order to achieve said shuffled order such that respective pairs of segments which were adjacent in said first order are separated by corresponding inter-segment distances in said shuffled order; and the minimum of said inter-segment distances for said subsets is maximized.

40. The receiver of claim 15, wherein:

the data segments comprise television program guide data.

41. The receiver of claim 33, wherein:

said data segments are arranged as a plurality of pages; and each page comprises an associated graphical image for a television program guide.

42. The receiver of claim 35, wherein:

the plurality of pages are arranged sequentially in said first page order, and odd-numbered pages are grouped with one another, and even-numbered pages are grouped with one another, in said second page order.

43. The receiver of claim 35, wherein:

said second page order enables the plurality of pages to be retrieved from the data stream according to a common packet identifier.

44. The receiver of claim 35, wherein:

in the second page order, data segments from neighboring pages in said first page order are carried in non-adjacent pages.

45. The receiver of claim 36, wherein:

the plurality of blocks comprise at least one of foundation blocks, schedule listing blocks, and description blocks for a television program guide.

46. The receiver of claim 45, wherein:

the frequency of the description blocks in the data stream is less than the frequency of the schedule listing blocks.

47. The receiver of claim 45, wherein:

the frequency of the foundation blocks in the data stream is greater than the frequency of the schedule listing blocks.

* * * * *